United States Patent [19]

Metz et al.

[11] Patent Number: 4,530,028
[45] Date of Patent: Jul. 16, 1985

[54] ELECTROMAGNET WITH EXPANDIBLE CORES FOR EXCITING COILS

[75] Inventors: Rudi Metz, Donzdorf; Herbert Scholl, Göppingen, both of Fed. Rep. of Germany

[73] Assignee: EMAG Maschinenfabrik GmbH, Salach, Fed. Rep. of Germany

[21] Appl. No.: 481,046

[22] Filed: Mar. 31, 1983

[30] Foreign Application Priority Data

Apr. 2, 1982 [DE] Fed. Rep. of Germany ....... 3212465

[51] Int. Cl.³ .............................................. H01H 50/18
[52] U.S. Cl. .................................... 361/144; 361/146; 336/132
[58] Field of Search ....................... 361/144, 143, 146; 336/119, 132, 133, 134; 335/298, 291, 281

[56] References Cited

U.S. PATENT DOCUMENTS 2,437,021  3/1948  Fries ..................................... 336/134
3,618,066  11/1971  Brommont ....................... 361/144 X Primary Examiner—Reinhard J. Eisenzopf
Attorney, Agent, or Firm—Peter K. Kontler

[57] ABSTRACT

A lifting electromagnet for ferromagnetic workpieces has two composite cores which extend downwardly from a yoke. Each core has a first section which is rigid with the yoke and is surrounded by an exciting coil, a second section which is connected with the respective first section, and at least one third section which is movable with reference to the second section, either up or down or horizontally. The poles at the lower ends of the third sections make an angle of 120 degrees, the same as the poles at the lower ends of the second sections. The second sections are surrounded by induction coils, and a further induction coil is disposed between each pair of neighboring third sections. The distance between the second sections is less than the distance between the first sections, and the distance between the second sections exceeds the distance between each pair of third sections. Each pair of third sections forms part of an auxiliary magnet which is movable up and down or horizontally, depending on the nature of the workpieces which are to be lifted and transported by the electromagnet. An electromagnet with one or more horizontally movable auxiliary magnets is used for the transport of elongated workpieces, and an electromagnet with one or more vertically movable auxiliary magnets is used for the transport of large- or small-diameter workpieces.

17 Claims, 2 Drawing Figures

F I G. 1
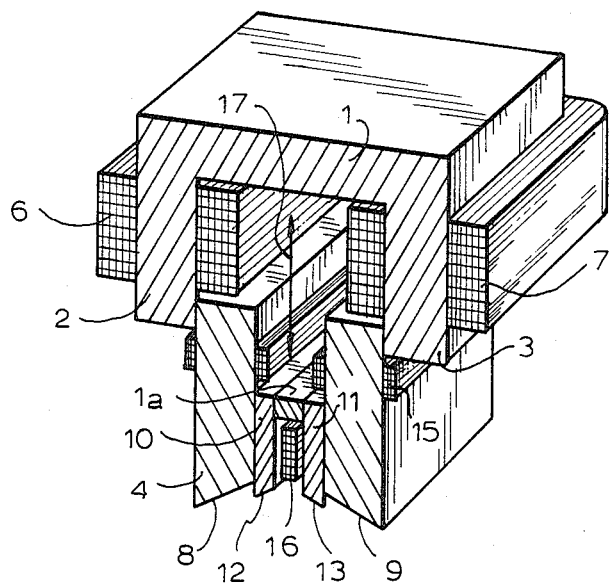

ELECTROMAGNET WITH EXPANDIBLE CORES FOR EXCITING COILS

CROSS-REFERENCE TO RELATED CASE

The electromagnets which are shown in the present application are similar to that shown in FIG. 8 of our commonly, owned copending application Ser. No. 480,401 filed Mar. 30, 1983 for "Lifting Electromagnet".

BACKGROUND OF THE INVENTION

The present invention relates to devices for transporting objects (e.g., workpieces) which consist (entirely or in part) of ferromagnetic material so that they can be lifted, attracted and transported by an electromagnet. More particularly, the invention relates to improvements in lifting electromagnets, especially for use in or in conjunction with machine tools, e.g., to deliver workpieces to and to remove workpieces from the treating stations of material removing machines.

It is known to use lifting electromagnets for the transport of ferromagnetic substances, e.g., scrap metal. It is also known to use electromagnets as a means for feeding workpieces to and for removing workpieces from the work processing stations of machine tools. Proper operation of such electromagnets is ensured only if they can predictably grip, lift and transfer selected workpieces, and they should be sufficiently versatile to be capable of properly engaging workpieces having different diameters, lengths and/or other parameters. For example, if a lifting electromagnet is used to transfer workpieces from a container to the work treating station of a machine, the electromagnet should be capable of properly grasping randomly or uniformly distributed workpieces which are confined in the container, of delivering such workpieces to the treating station and leaving the thus delivered workpieces at the treating station or transferring finished workpieces from the treating station to a different location, e.g., onto a conveyor which delivers the treated workpieces to a further machine, to a different container, to storage or to another destination.

Conventional lifting electromagnets are incapable of engaging and transporting differently configured and/or dimensioned workpieces. For example, a first lifting electromagnet is required to lift largediameter rods, and a different second electromagnet is used for the lifting of rods having relatively small diameters. The same holds true if a set of relatively short workpieces is followed by a set of longer or much longer workpieces or if a batch of lightweight workpieces is followed by a batch of much heavier workpieces. An electromagnet which can properly lift a relatively short workpiece may not be suited for the lifting of much longer workpieces because a longer workpiece is likely to change its orientation (e.g., by tilting) and to become dispengaged from the poles of the electromagnet. Tilting moments are likely to develop if the electromagnet engages a long workpiece at a locus which is remote from the center (i.e., not midway between the longitudinal ends) of the workpiece. Such unexpected or unintentional descent of a long and possibly heavy metallic or like workpiece is likely to interrupt the operation of a production line, to cause damage to the machine and/or to injure the attendants.

OBJECTS AND SUMMARY OF THE INVENTION

An object of the invention is to provide a novel and improved lifting electromagnet which is constructed and assembled in such a way that its versatility greatly exceeds that of conventional electromagnets.

Another object of the invention is to provide an electromagnet which can be rapidly converted from lifting of longer to the lifting of shorter objects, from lifting of larger-diameter objects to the lifting of smaller-diameter objects, from lifting of heavier objects to the lifting of lightweight objects, and vice versa.

A futher object of the invention is to provide an electromagnet which can automatically detect the presence and its distance from an object whose material is capable of influencing its magnetic field.

Still another object of the invention is to provide a novel and improved method of changing the effective areas of the poles of a lifting electromagnet.

An additional object of the invention is to provide the improved electromagnet with novel cores for the exciting coils.

Still another object of the invention is to provide the electromagnet with novel and improved means for rapidly converting its cores for the attraction, retention and/or transfer of differently configured and/or dimensioned objects.

Another object of the invention is to provide a lifting electromagnet which can be used with particular advantage to feed and/or remove workpieces in machine tools or the like.

A further object of the invention is to provide a lifting electromagnet which can be used as a superior, especially more versatile, substitute for heretofore known lifting electromagnets.

The invention resides in the provision of a lifting electromagnet, particularly for the transport of workpieces to and/or from the treating stations of machine tools. The electromagnet comprises a plurality of poles, exciting coil means, and cores which connect the coil means with the poles. At least one of the cores comprises a plurality of sections, and at least one of these sections is movable with reference to another section. The one section can be at least partially telescoped into the other section of the one core.

The poles form a first group and a second group, and such groups are preferably mirror symmetrical to one another with reference to a plane which extends between the respective cores. Thus, the one core is disposed at one side of the symmetry plane and the cores preferably include a second core which is disposed at the other side of the symmetry plane and also includes a plurality of sections at least one of which is movable with reference to another section.

The electromagnet preferably further comprises sensor means which serve to generate signals in response to penetration of an at least predominantly ferromagnetic workpiece or another object into the field of the electromagnet. The sensor means can comprise an induction coil or a semiconductor which is disposed between the movable sections of the one core and the second core, and/or a discrete induction coil for each core. Each induction coil preferably surrounds the other section of the respective core.

If the electromagnet is used to remove workpieces from or to insert workpieces into a container having at least one internal surface with a predetermined inclination to the vertical, the electromagnet is preferably designed in such a way that the outermost edge of its lowermost portion and an outermost edge of one of its outer sides can be connected by a line whose inclination to the vertical is less than or does not exceed the aforementioned predetermined inclination.

The arrangement can be such that the one section of each core which includes a movable section is freely movable within limits with reference to the corresponding other section. Such one section can be moved up and down and then normally assumes its lower end position under the action of gravity. Alternatively, the electromagnet can comprise (or it can be associated with) means for moving the one section with reference to the other section. Such moving means can comprise an electric motor and/or a fluidoperated motor. Furthermore, such electromagnet can comprise control means which serves to regulate the operation of the motor in accordance with a predetermined pattern, e.g., in dependency on the length of the workpieces or as a function of the diameters of the workpieces.

The poles which are connected with the movable sections of the one core and the second core can be disposed in mutually inclined planes, and these planes can make an angle of or close to 120 degrees. The other section of the one core is connected with a third pole which is disposed in a plane whose inclination is preferably the same as that of the pole on the corresponding one (movable) section, and the other section of the second core is connected with a fourth pole whose plane is preferably inclined in the same way as the plane of the pole which is connected to the respective one (movable) section. The movable sections of the one core and of the second core can be moved to and from positions in which the planes of the respective poles coincide with the planes of the poles that are connected with the associated other sections. Alternatively, the planes of the poles which are connected with the movable sections can permanently coincide with the planes of the third and fourth poles irrespective of the positions of the movable sections.

The movable sections can be said to constitute one or more auxiliary magnets which are movable up and down with reference to a yoke that connects the various cores, or which are movable toward and away from one another without changing their distance from the yoke. This depends on the nature of objects which are to be transportated, i.e., the auxiliary magnet or magnets will be movable up and down if the electromagnet is to lift and transfer workpieces having different diameters, and the auxiliary magnet or magnets will be moved horizontally if the electromagnet is to lift and/or transfer shorter or longer workpieces.

The novel features which are considered as characteristic of the invention are set forth in particular in the appended claims. The improved lifting electromagnet itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary perspective view of a lifting electromagnet which embodies one form of the present invention.

DESCRIPTION OF THE PREFERRED EMBODIMENTS

Figure 2:
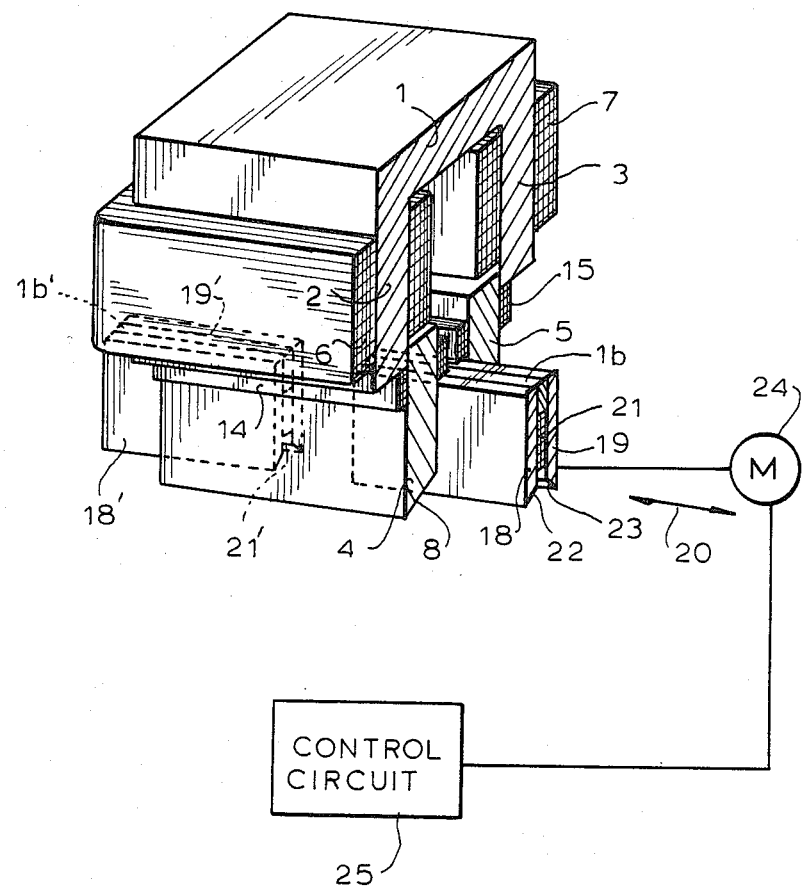
FIG. 2 is a fragmentary perspective view of a modified lifting electromagnet.

The electromagnet which is shown in FIG. 1 comprises two spaced-apart parallel iron cores 2, 3 connected to a yoke 1 and respectively carrying exciting coils 6 and 7. The cores 2 and 3 are respectively provided with extensions 4 and 5 which are disposed between and extend forwardly (downwardly) beyond the cores and have poles 8 and 9 disposed in two mutually inclined planes. The angle between the planes of the poles 8 and 9 is preferably 120 degrees; such angle is highly satisfactory if the poles 8 and 9 are to attract an elongated rodshaped object.

The electromagnet of FIG. 1 further comprises an auxiliary magnet having additional core extensions 10, 11 which are inwardly adjacent to the extensions 4, 5 and are movable toward and away from the yoke 1 in directions indicated by a double-headed arrow 17. When moved to their lower end positions, the additional extensions 10, 11 extend beyond the respective main or primary extensions 4, 5. The planes of the poles 12, 13 at the free ends of the additional extensions 10, 11 preferably make the same angle as the planes of the poles 8 and 9. When the additional magnet including the extensions 10, 11 is moved to the fully retracte position (nearest to the yoke 1), the poles 12 and 13 are respectively coplanar with the poles 8 and 9. The electromagnet of FIG. 1 is then ready to lift and transfer large-diameter workpieces. If the diameters of the workpieces are small or relatively small, the extensions 10, 11 are shifted or allowed to move away from the yoke 1 to their outermost positions in which a smaller-diameter workpiece can be attracted solely by the poles 12 and 13. The polarity of the additional extensions 10, 11 is identical with that of the respective main extensions 4 and 5. A yoke 1a connects the extensions 10 and 11 for joint movement in the directions indicated by the arrow 17.

The extensions 4 and 5 are respectively surrounded by induction coils 14 and 15 which constitute sensors serving to respond to changes of the magnetic field as a result of movement of the electromagnet toward a ferromagnetic object and/or vice versa. A further sensor 16, again in the form of an induction coil, is disposed between the additional extensions 10 and 11. The sensor 16 can be replaced with a plate-like semiconductor, especially if the illustrated structure constitutes a direct-current electromagnet.

The auxiliary magnet could be moved up and down by a motor or the like. However, it is presently preferred to mount this auxiliary magnet with freedom of movement between the upper and lower end positions (i.e., a position nearest to and a position at a maximum distance from the yoke 1) by providing suitable stops on the main extensions 4 and 5. Thus, the auxiliary magnet will normally assume its lower end position under the action of gravity whereby the planes of its poles 12, 13 are disposed at a level below the planes of the poles 8 and 9. The lifting electromagnet is then ready to attract and lift small-diameter rods or the like. If the electromagnet is to thereupon lift a larger-diameter workpiece and moves sufficiently close to such workpiece, the workpiece can simply lift the auxiliary magnet to its upper end position or the auxiliary magnet is lifted automatically as a result of the magnetic force of the lifting electromagnet.

It will be noted that the sensors 14, 15 surround the main extensions 4, 5 of the cores 2, 3 and that the sensor 16 is disposed between the additional extensions 10, 11 of the cores 2 and 3. This is desireable and advantageous because the sensitivity of sensors between the extensions 4, 5 is greater than if such sensors were installed between the cores 2, 3 (the distance between the cores 2, 3 exceeds the distance between the extensions 4, 5 and the sensitivity of the sensors 14, 15 is proportional to density of the stray magnetic flux between the neighboring iron parts). By the same token, the sensor 16 is highly sensitive to changes in the characteristics of the magnetic field between the additional extensions 10, 11 because the mutual spacing of the extensions 10, 11 is a fraction of the distance between the extensions 4, 5.

If the improved electromagnet is used for removal of workpieces from a container having one or more inclined internal surfaces, or for insertion of workpieces into such a container, its work engaging part or parts can be designed with a view to facilitate the insertion of workpieces into and their removal from the containers. To this end, the line which connects the outer edge of the lowermost part of the electromagnet with the outermost lateral edge of the electromagnet makes with a vertical line an angle at most equaling the angle of inclination of the internal surface of the container. With reference to FIG. 1, this means that the auxiliary magnet of FIG. 1 should be movable downwardly to a lower end position in which the lowermost edge at one side of the downwardly extended auxiliary magnet and the outermost edge at the other side of the electromagnet can be connected by a line making with the vertical an angle not exceeding the angle of inclination of the internal surface of the container. This means that the width of the power generating part of the electromagnet can be selected practically at will, as long as one ensures that the direction of force transmission (namely, the inclination of the connection between the exciting coil and the pole) takes place at an angle which does not exceed the angle of inclination of the internal surface of the container. Such design of the electromagnet guarantees that workpieces which are adjacent to the inclined internal surface can be properly approached and attracted by the electromagnet without the gripper abutting against the internal surface.

FIG. 2 shows a lifting electromagnet wherein all such parts which are identical with or clearly analogous to the corresponding parts of the electromagnet of FIG. 1 are denoted by similar reference characters. The single additional or auxiliary magnet 10, 11, 1a of FIG. 1 is replaced by two discrete aligned auxiliary magnets which are movable toward and away from each other in parallelism with, rather than toward and away from, the yoke 1. The right-hand auxiliary magnet comprises two core extensions 18, 19 with poles 22, 23 and a yoke 1b, and the left-hand auxiliary magnet comprises two core extensions 18', 19' and a yoke 1b'. These auxiliary magnets are disposed between the core extensions 4, 5 which respectively carry the aforementioned induction coils 14 and 15. An induction coil 21 is located between the extensions 18, 19, and a further induction coil 21' is disposed between the extensions 18', 19'. The polarity of the extensions 18, 18' matches that of the core 2 and extension 4, and the plarity of extensions 19, 19' matches that of the core 3 and extensions 5. The double-headed arrow 20 denotes the directions in which the auxiliary magnets are movable with reference to the extensions 4 and 5.

If the auxiliary magnets are moved away from each other (or if one of the auxiliary magnets is moved away from the other auxiliary magnet), the lifting electromagnet of FIG. 2 can more reliably manipulate elongated workpieces, e.g., small-diameter or large-diameter rods which need by attracted only by the poles 22, 23 or the right-hand auxiliary magnet and by the poles of the extensions 18', 19' or by such poles plus the pole 8 and the pole (not shown) of the extension 5. If the two auxiliary magnets are moved toward each other, the lifting electromagnet is suitable for the manipulation of relatively short objects. If the objects are rods, the distance between the auxiliary magnets will be selected with a view to ensure that a suspended rod is not likely to be tilted with reference to the auxiliary magnets to thus become disengaged and/or to change its position and interfere with proper transfer to a treating station or the like.

Each of the two induction coils 21, 21' can be replaced with a plate-like semiconductor without departing from the spirit of the invention. These coils constitute sensors which facilitate the determination of the position of an object in a receptacle or the like by ascertaining the changes in magnetic field which develop when such magnetic field is influenced by the object. The corresponding signals are used to control the movement of the lifting electromagnet toward and into optimum engagement with the object.

The two discrete auxiliary magnets of FIG. 2 contribute to versatility of the lifting means, i.e., they enable the lifting electromagnet to manipulate a wide variety of different workpieces.

The purpose of the extensions 4 and 5 is to densify the stray flux per unit area beyond that densification which is achieved by the cores 2 and 3. This is achieved by the simple expedient of installing the extensions 4, 5 between the respective cores 2, 3 so that the spacing between the extensions 4, 5 is less than that between the cores 2 and 3. Analogous results could be obtained by making the extensions 4 and 5 integral with the respective cores 2 and 3, e.g., in a manner as shown in FIGS. 4 and 5 of the aforementioned copending patent application Ser. No. 480,401 for "Lifting Electromagnet". Densification of the stray flux is of particular importance for the sensors of the electromagnet because the sensors respond to changes in the stray magnetic flux.

The inclination of the planes of poles on the extensions 4 and 5 (only the pole 8 is shown) is preferably the same as that of the poles 22, 23 on the additional extensions 18, 19 as well as of the poles on the additional extensions 18', 19'. Moreover the poles of extensions 4, 18, 18' are disposed in a first common plane, and the poles of extensions 5, 19, 19' are disposed in a second common plane. The composite pole including the poles 8, 22 and the pole of the extension 18' can be shortened or lengthened by moving the one and/or the other auxiliary magnet in the directions indicated by the arrow 20, and the same holds true for the other composite pole which includes the poles 9, 23 and the pole of the extension 19'.

The manner in which the lifting electromagnet of the present invention can be mounted in a crane or in any other device that can move the electromagnet toward or away from a ferromagnetic object or any other object which is capable of influencing the electromagnetic field forms no part of the invention. For example, the electromagnet can be suspended on the cable of a crane. As shown schematically for the right-hand auxiliary magnet, the means for moving this magnet toward and away from the other auxiliary magnet can comprise a reversible electric motor 24. Alternatively, the right-hand auxiliary magnet of FIG. 2 can be reciprocated by a hydraulic, pneumatic or hydropneumatic motor, e.g., by a double-acting cylinder and piston unit. A similar motor can be provided for the left-hand auxiliary magnet of FIG. 2. Of course, if the two auxiliary magnets are to move simultaneously (in opposite directions), the means for moving such auxiliary magnets can comprise a single reversible motor which moves the two auxiliary magnets through the medium of a suitable transmission. By way of example, the transmission can comprise two mating gears one of which is driven by the motor and each of which drives a pinion meshing with a toothed rack. One of the racks is connected to the left-hand auxiliary magnet and the other rack is connected with the right-hand auxiliary magnet. This is but one of several possible means for simultaneously driving the two auxiliary magnets in opposite directions.

As a rule, the lifting electromagnet of FIG. 2 will be held in the illustrated position (with the cores 2 and 3 extending downwardly from the yoke 1). Therefore, free movability of the additional extensions 18, 19 and/or 18', 19' toward and away from the yoke 1 would serve no useful purpose because this electromagnet is designed to pick up shorter or longer workpieces, i.e., a mode of operation which requires a movability of the auxiliary magnets in parallelism with rather than toward or away from the yoke 1. Of course, it is conceivable to consturct the improved electromagnet in such a way that the auxiliary magent or magnets can move toward or away from as well as in parallelism with the yoke. Such electromagnet then embodies the features of the electromagnets which are shown in FIGS. 1 and 2.

The motor 24 of FIG. 2 can be operated by a programmable control circuit 25 which is designed to operate the motor in dependency on the length, diameter and/or other parameters of the workpieces to be lifted and transported by the poles. The control circuit 25 automatically changes the distance between the two auxiliary magnets as soon as it receives a signal denoting the diameters of a batch of workpieces which are to be fed to the treating station of a machine tool or the like. The programmable control circuit 25 can be used in addition to or in lieu of the sensor means 14, 15, 21 and 21', or it can incorporate such sensor means.

In accordance with one of the presently prefered modes of designing the sensor means, such sensor means can include one or more first sensors which can detect one end of an elongated workpiece and one or more second sensors provided on a mobile auxiliary magnet and serving to detect the other end of the workpiece on movement of the auxiliary magnet with reference to the main portion of the lifting electromagnet. In this manner, the distance between a pair of mobile auxiliary magnets can be selected with a view to ensure that the poles of one auxiliary magnet are adjacent to one end and the poles of the other auxiliary magnet are adjacent to the other end of the workpiece, i.e., that the workpiece can be lifted without any danger of tilting because the regions of engagement with the auxiliary magnets are spaced apart from one another to the maximum extent permitted or required by the length of the workpiece in question. Of course, the electromagnet of FIG. 2 can be used with great advantage also when the length of a workpiece exceeds the maximum distance between the two auxiliary magnets; these auxiliary magnets then engage the elongated workpiece at the opposite sides of its central portion and as far away from the central portion as possible. This, too, reduces the likelihood of tilting of the enlongated workpiece while the workpiece is suspended from the electromagnet.

As mentioned above, the sensors of the improved electromagnet can be connected with or can form part of the aforediscussed programmable control circuit 25 which can be used to automatically determine the direction and the extent of movement of the electromagnet into engagement with workpieces. Also, such control circuit can be used to automatically release treated or transferred workpieces, e.g., into a container for finished products. If the sensor or sensors are disposed centrally of the electromagnet, they can ascertain whether or not the electromagnet is disposed above the central portion of the workpiece which is about to be attacted and transported. Also, such centrally located sensor or sensors can ascertain whether or not the entire surface of each and every pole is located above and can contact the workpiece therebelow. Still further, the centrally located sensor or sensors can ascertain whether or not the poles are in optimum positions to ensure that the central symmetry axis of the electromagnet will be coplanar with the axis of an elongated rod-shaped or analogous workpiece i.e., whether or not the poles 8, 9 and/or 12, 13 and/or 22, 23 are disposed at the opposite sides of the axis of a rod-shaped workpiece which is about to be lifted. Still further, such centrally located sensor or sensors can ascertain whether or not the entire electromagnet overlies an elongated workpiece (i.e., that one end of the workpiece is not located somewhere between the ends of the poles 12, 13 or 8, 9 in FIG. 1 or somewhere between the rightmost ends of the poles 22, 23 and the poles on the extensions 18', 19' of FIG. 2. Furthermore, a suitable control circuit which employs one or more centrally located sensors can be used to automatically move the electromagnet over the central portion of a workpiece as soon as the sensor or sensors detect one end of the workpiece; all that is necessary is to supply the control circuit with information pertaining to the length of the workpiece which is to be transported. In other words, the control circuit can be used to automatically locate the electromagnet midway between the ends of a long workpiece if the control circuit stores or receives information pertaining to the length of the workpiece and the sensor or sensors are capable of detecting the one or the other end of the workpiece.

The provision of more than one sensor is desirable and advantageous if the electromagnet should automatically find the shortest path toward an optimum position with reference to a workpiece. The distribution of several sensors (e.g., in a manner as disclosed in the aforementioned commonly owned copending patent application Ser. No. 480,401) renders it possible to accurately ascertain the position of the electromagnet with reference to an object and even the orientation of the electromagnet with reference to the object and/or vice versa. Such multiple sensors can be disposed symmetrically with reference to the center of the electromagnet. Moveover, the utilization of several sensors which are distributed around the center of the electromagnet facilitates a determination whether or not the electromagnet is disposed exactly above and centrally of a workpiece.

The multiple sensors can be connected in a suitable bridge circuit.

In each of the illustrated embodiments of the improved electromagnet, the movable extensions 10, 11 or 18, 18' and 19, 19' of the cores for the exciting coils 6, 7 are disposed at the opposite sides of and are equidistant from a symmetry plane extending between the coils 6, 7 and halving the yoke 1. However, it is equally within the purview of the invention to provide only one of the iron cores 2, 3 with one or more mobile extensions. For example, the electromagnet can be provided with one or more fixed cores and one or more cores which consist of several sections at least one of which is movable with reference to the other section or sections. Furthermore, the cores and/or their extensions need not be straight and/or flat. Such cores and/or their extensions can assume any one of a practically unlimited number of different forms in order to ensure that the configuration of the cores and/or the mutual spacing of the poles and/or the areas of the poles are best suited for the attraction and retention of specific workpieces. It has been found that, at least in the majority of instances, a lifting electromagnet which consists of two mirror symmetrical halves is highly satisfactory and sufficiently versatile to be useful for the lifting and transport of a wide variety of workpieces. Thus, the poles of the electromagnet preferably include two sets or groups which are mirror symmetrical to one another with reference to a plane extending between the respective cores. Also, the mobile (auxiliary) magnet or magnets preferably resemble the main electromagnet. With reference to FIG. 2, each of the auxiliary magnets is a smaller-scale replica of the main electromagnet including the yoke 1 and the cores 2, 3. These cores can be said to constitute the first sections of two composite cores, and the composite cores further comprise second sections (extensions 4, 5) which are rigid with the respective first sections (2, 3) as well as third sections (extensions 18, 18' and 19, 19') which are movable with reference to the second sections. It will be noted that the first sections (2, 3) of the two composite cores are separated from one another by a first air gap (which may contain a nonmagnetic material), that the second sections (4, 5) of the composite cores are separated from each other by a narrower second air gap, and that the third sections (18, 18' and 19, 19') of the two composite cores are again separated from one another by discrete air gaps which are narrower than the gap between the second sections 4, 5 and may but need not contain nonmagnetic materials.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A lifting electromagnet, particularly for transporting workpieces to and/or from machine tools, comprising a plurality of poles; exciting coil means; and cores connecting said coil means with said poles, at least one of said cores comprising a plurality of sections and at least one of said sections being movable with reference to another section.

2. The electromagnet of claim 1, wherein said one section is at least partially telescoped into said other section.

3. The electromagnet of claim 1, wherein said poles comprise a first group and a second group, said groups of poles being mirror symmetrical to one another with reference to a plane extending between the respective cores, said one core being disposed at one side of said plane and said cores further including a second core disposed at the other side of said plane and also including a plurality of sections at least one of which is movable with reference to another section.

4. The electromagnet of claim 1, further comprising sensor means arranged to generate signals in response to penetration of an at least predominantly ferromagnetic object into the field of said electromagnet.

5. The electromagnet of claim 4, wherein said cores include a second core also comprising several sections at least one of which is movable with reference to another section, said sensor means including a sensor disposed between the movable sections of said one core and said second core.

6. The electromagnet of claim 4, wherein said sensor means comprises induction coils surrounding portions of said cores.

7. The electromagnet of claim 1 for removal of objects from or for insertion of objects into a container having an internal surface with a predetermined inclination to the vertical, said electromagnet having a lowermost portion including an outermost edge and an outer side having an outermost edge, a line which connects said edges making with the vertical an angle which at most equals said predetermined inclination.

8. The electromagnet of claim 1, wherein said one section of said one core is freely movable within limits relative to the other section of said one-core.

9. The electromagnet of claim 8, wherein said one section is movable up and down between upper and lower end positions and normally assumes said lower end position under the action of gravity.

10. The electromagnet of claim 1, further comprising means for moving said one section with reference to said other section.

11. The electromagnet of claim 10, wherein said moving means comprises an electric motor.

12. The electromagnet of claim 10, wherein said moving means comprises a fluid-operated motor.

13. The electromagnet of claim 1, wherein said one section is connected with one of said poles and said cores include a second core having a plurality of sections one of which is movable with reference to another section, said one section of said second core being connected to another of said poles, the poles which are connected with said movable sections being disposed in two mutually inclined planes.

14. The electromagnet of claim 13, wherein the planes of poles which are connected with said movable sections make an angle of approximately 120 degrees.

15. The electromagnet of claim 13, wherein said other section of said one core is connected with a third pole disposed in a plane which is parallel to the plane of the pole connected to the respective movable section, said other section of said second core being connected with a fourth pole disposed in a plane parallel to the plane of the pole which is connected with the respective movable section.

16. The electromagnet of claim 15, wherein the movable sections of said one core and said second core are movable to and from positions in which the planes of the poles that are connected therewith respectively coincide with the planes of said third and fourth poles.

17. The electromagnet of claim 13, wherein said other section of said one core is connected with a third pole whose plane coincides with the plane of the pole connected to the respective movable section in all positions of such movable section, said other section of said second core being connected with a fourth pole whose plane is coplanar with that of the pole which is connected to the respective movable section in all positions of such movable section.

* * * * *